Figure 1:
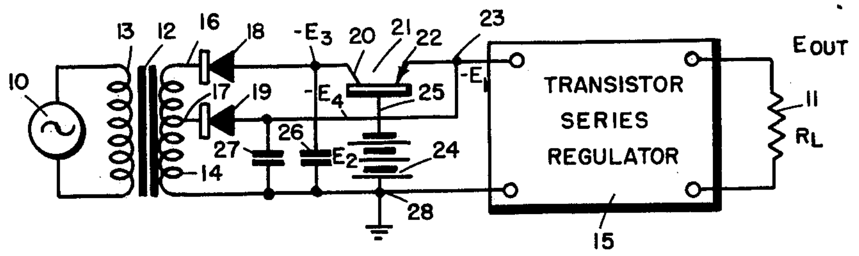

Oct. 23, 1962 F. L. WILEY 3,060,320

VOLTAGE REGULATOR

Filed Nov. 25, 1958 2 Sheets-Sheet 1

INVENTOR.
FRANK L WILEY

BY [signature]
AGENT

INVENTOR.
FRANK L. WILEY
BY
Louis J. Knobbe
AGENT 3,060,320
Patented Oct. 23, 1962

3,060,320
VOLTAGE REGULATOR
Frank L. Wiley, Long Beach, Calif., assignor to North American Aviation, Inc.
Filed Nov. 25, 1958, Ser. No. 776,369
7 Claims. (Cl. 307—64)

This invention relates to voltage regulation, and more particularly to apparatus for regulating the voltage when large variations occur in the primary supply voltage.

A particular application of the voltage regulator herein disclosed is for supplying the collector voltage to series transistor regulators. Such series transistor regulators are well known and widely used today in electronic circuits which require minimum changes of load voltage. For example, such regulators are shown and described in my co-pending application, Serial No. 679,424, entitled, "Current Protection Device," filed August 21, 1957, and assigned to North American Aviation, Inc., assignee of the present invention. Other examples of series-type regulators are found on page 431 of the book entitled "Transistor Circuit Engineering" edited by Richard F. Shea, and published by John Wiley and Sons, Inc., 1957, and in the co-pending application, Serial No. 698,967, entitled "Series Transistor Regulator," filed November 26, 1957, by George N. Klees, and also assigned to North American Aviation, Inc.

In these, and other transistor regulators, the voltage across a load is regulated by controlling the current through a transistor in series between the source and the load. The controlling current is a direct function of the load for any given output voltage and is derived by comparing the load voltage with a reference voltage in an amplifier which produces an output current proportional to the difference between the load voltage and the reference voltage. The base of the series regulator transistor is responsive to this output current. Accordingly, the flow of current from the source to the load is varied so as to maintain the voltage across the load substantially constant.

The principal disadvantage of present-day series regulators is the limited current which can be controlled by the series transistor regulating device. The series transistors are limited in the amount of power and current which they can pass. The problem is particularly aggravated when the primary supply voltage fluctuates considerably in magnitude. Many applications such as digital computers require the supply voltages to be precisely regulated. Thus, if a particular load such as digital circuitry requires that the voltage across it be maintained at 15 volts, the voltage input to the series regulator can never fluctuate below 15 volts. It is not uncommon that the primary voltage supply has high and low line transients as large as 25 percent of the steady state voltage. Therefore, in this example in order to insure a minimum 15 volts across the load, a steady state voltage of 20 volts would have to be supplied to the input of the series regulator. The series regulator then must be able to regulate input voltages as high as 25 volts with the assumed 25 percent transients. Thus, in a system which need only deliver 15 volts, it must nevertheless be designed to handle voltages as high as 25 volts. The additional power which must be dissipated in the series regulator for these higher voltages is an important design consideration requiring derating of the power transistors used as the series regulator elements and the use of a plurality of such series transistors in parallel.

My invention is a voltage regulator particularly designed for connection between the primary supply voltage and the series transistor voltage regulator. This invention, when applied to the foregoing example, reduces the voltage variations into the series regulator from the presumed 15 to 25 volt range to a considerably smaller range in the order of, for example, 15 to 20 volts. In applications which do not require the regulated voltage output to be maintained at a substantially constant value, my invention may be connected directly between the primary power supply and the load.

Accordingly, it is an object of this invention to provide an improved voltage regulator.

It is another object of this invention to effectively reduce the transients appearing on the primary supply voltage.

It is still another object of this invention to provide a voltage regulator particularly adapted for minimizing the power dissipation requirements of series transistor regulators connected thereto.

It is another object of this invention to provide a voltage regulator having a fast response to line transients.

It is still another object of this invention to provide a voltage regulator in which the high voltage transients are disconnected from any transistor circuitry.

Other and further objects, features, and advantages of the invention will become apparent as the description proceeds.

In brief, one embodiment of my invention comprises circuitry which changes the secondary tap on the primary supply voltage transformer in response to line transients. The circuitry is such that the steady state and high line transients are not required to pass through any transistor circuitry, transistor circuitry being only used to regulate low line transients. The power required to be dissipated by the transistor circuitry is accordingly minimized.

Figure 3:
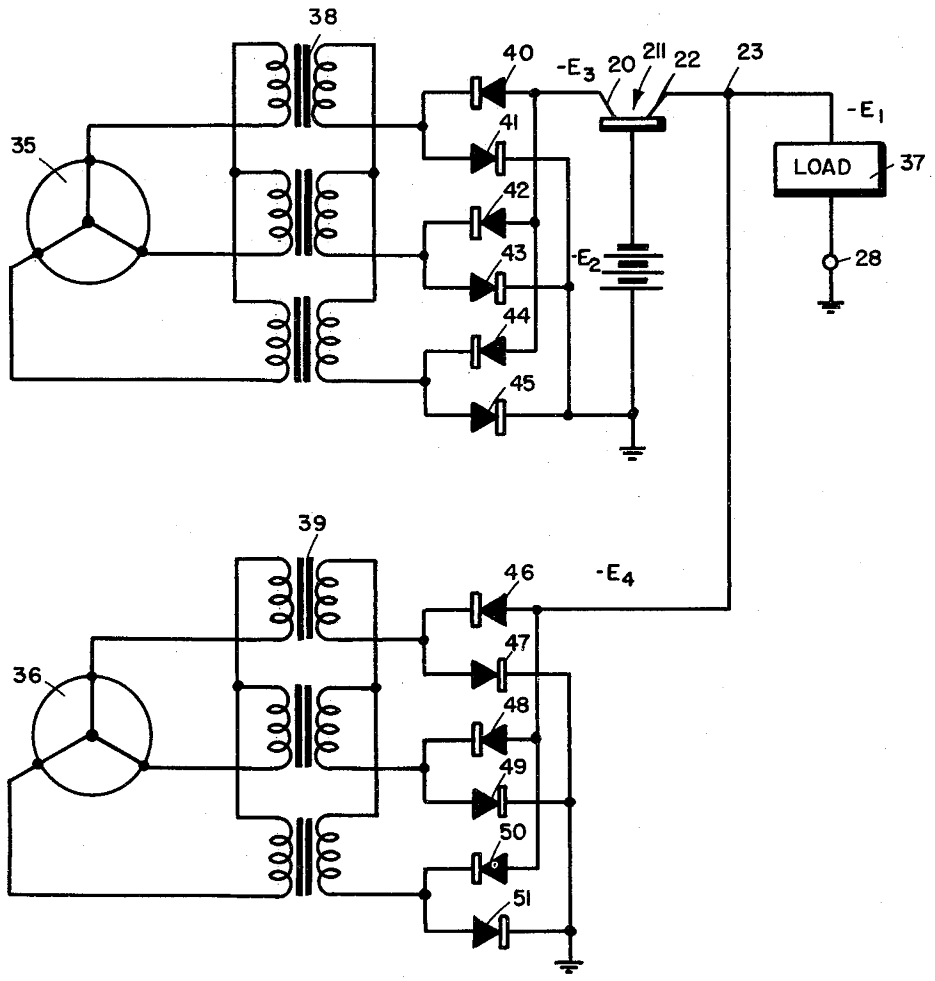

A more thorough understanding of the invention may be obtained by a study of the following detailed description taken in connection with the accompanying drawings in which:

FIG. 1 illustrates schematically a single-phase embodiment of my invention;

FIGS. *2a* and *2b* illustrate graphically the reduction in line transients provided by my invention; and FIG. 3 illustrates a three-phrase embodiment of this invention.

In FIG. 1, a primary alternating voltage supply 10 is connected to supply power to a load 11 ($R_L$). Transformer 12, having primary winding 13 and secondary winding 14, reduces the voltage of the primary supply to the level required by various transistor circuits. Ordinarily the output of the secondary winding 14 is rectified and connected directly to the input of a transistor series regulator 15 having the load 11 connected to its output. The transistor series regulator 15 may comprise any one of a plurality of circuits known in the art. Three examples of such circuits have been referenced in the introduction above. When the secondary is so connected directly to the input of the transistor series regulator 15, it will be apparent that the transistor series regulator circuitry will have to handle the full transients which occur at the primary supply 10. In many applications, for example, in airborne alternators, these high and low transients are quite severe and may each be as large as 25 percent or more of the steady state value. Thus, if the voltage output from the supply 10 were a steady state r.m.s value of 115 volts, transient voltages in the range of 90 to 140 volts would appear at the input of the transformer 12. With this wide magnitude of variation in the primary supply voltage, the steady state voltage and maximum voltage input to the series regulator 15 are considerably higher then the desired constant voltage $-E_{out}$ across the load $R_L$. For example, if the voltage across the load 11 is to be maintained at 15 volts direct current, the voltage input to the regulator 15 ($-E_I$) can never fall below this desired output voltage. In order to insure that the minimum voltage at the input of the regulator is never below 15 volts, the steady state voltage and maximum transient voltages into the transistor regulator are accordingly −20 and −25 volts direct current assuming the 25 percent high and low line transients. Thus, in order to ensure an output $-E_{out}$ of −15 volts, the transistor series regulator must be designed to handle input voltages of −25 volts, i.e., the regulator 15 must be designed to handle 66 percent higher voltage inputs than the required output voltage of −15 volts. As noted above, in the design of transistor circuitry a very important consideration is that of minimizing the power required to be dissipated within the transistor regulator device. Obviously, considerably higher powers will be dissipated with the higher input voltages to the series regulator than would otherwise be required if the primary voltage supply was held to a substantially constant level.

The circuitry shown in FIG. 1, located between the transformer 12 and the series regulator 15, is designed to limit the transients appearing at the input of the series regulator. As shown, the secondary winding 14 of transformer 12 is provided with a high voltage tap 16 and low voltage tap 17 to which are connected the cathodes of respective diodes 18 and 18. The anode of diode 18 is connected to the collector electrode 20 of p-n-p transistor 21. The emitter electrode 22 of transistor 21 is connected to an output terminal 23; the anode of diode 19 is connected directly to the output terminal 23. A source of reference voltage 24 is connected between the base electrode 25 of transistor 21 and ground. Respective capacitors 26 and 27 are connected between the anodes of diodes 18 and 19 and ground. Output terminal 23 and ground terminal 28 are connected to the input terminals of the transistor series regulator 15.

The voltage regulator shown in FIG. 1 operates as follows: Diodes 18 and 19 each serve to half-wave rectify the alternating voltage appearing at the taps 16 and 17 of the secondary winding of transformer 12. Shunt capacitors 26 and 27 serve as respective filter circuits for providing direct current having a ripple much smaller than is obtainable directly from the rectifying diodes. Other filter circuits well known in the art can be substituted for these shunt capacitors. Transistor 21 functions as a simple series regulator circuit. Thus, if the voltage $-E_1$ is decreased due to supply voltage changes, the voltage between the base electrode and emitter electrode is increased. This causes an increase in the base current. When the base current increases, the collector current will increase by an amount $\beta$ times the base current, where $\beta$ is the current amplification factor. The current flowing out of the emitter electrode is thus increased by an amount equal to the increase in the base and collector currents which in turn will increase the voltage $-E_1$. The opposite is true if the voltage $-E_1$ increases. Since the voltage between the emitter and base electrodes is very small, the voltage $-E_1$ will remain very nearly the same as the reference voltage $-E_2$ supplied by the source 24. The circuit of FIG. 1 is, however, designed so that the series transistor 21 does not supply any load current except for those periods of low line transients, i.e., periods of relatively low power dissipation. For steady state and high line transients, power is supplied from the voltage tap 17 through diode 19 directly to the output terminal 23. At these relatively high voltage levels (steady state or high line transients) diode 19 is forwardly biased since the voltage at tap 17 is of higher (negative) magnitude than the voltage delivered at the output terminal 23 from the series transistor 21, i.e., the voltage at tap 17 is more negative than the reference voltage $-E_2$. The voltages between the terminals 23 and 28 are then greater in (negative) magnitude than the reference voltage $-E_2$. The emitter electrode 22 of transistor 21 is then biased in a reverse direction thereby reducing the current flow to substantially zero. Thus, during such steady state and high line transients, the entire power for the transistor series regulator 15 is supplied from the lower voltage tap 17, the conduction of diode 19 influencing transistor 21 to a state of non-conduction.

For low line transients diode 19 is reverse biased since the voltage at tap 17 is of lower (negative) magnitude than the voltage delivered at the output terminal 23 from the series transistor 21, i.e., the voltage at tap 17 is less negative than the reference voltage $E_2$. The diode 19 thereby serves as a switch to disconnect the transformer tap 17 from the output terminal 23 when the voltage from tap 17 is insufficient to reverse bias the emitter electrode 22 of transistor 21. Thus, the different voltage taps 16 and 17 are never simultaneously connected to the output terminal 23. With the emitter electrode of transistor 21 forwardly biased, the transistor 21 functions as a series regulator and power is supplied to the output terminal 23 from the high voltage tap 16.

By giving numerical values to the circuit of FIG. 1, the advantages of my invention are made self evident. The following representative circuit parameters may be assigned:

| | |
|---|---|
| $-E_1$ | −15 volts minimum. |
| $-E_2$ | −15 volts. |
| $-E_3$ | −20 volts steady state with transients between −15 and −25 volts. |
| $-E_4$ | −16 volts steady state with transients between −15 and −20 volts. |

Figure 2A:
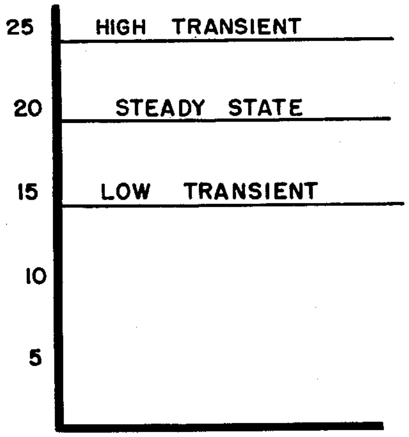
Figure 2B:
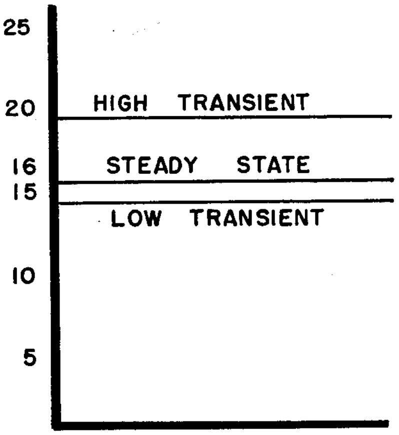

These parameters are by way of example only. The particular values of $-E_1$, $-E_2$, $-E_3$, and $-E_4$ will depend upon the circuit requirements. This example, however, clearly illustrates the reduction of voltage fluctuations achieved by the voltage regulation. At the steady state output of −20 volts at the input of the transistor 21 and −16 volts at the output of diode 19, the diode 19 is biased in a forward direction since the emitter electrode of transistor 21 remains at approximately the voltage of $-E_2$ or − 15 volts. Power will hence be drawn directly from the supply transformer to the input of the transistor series regulator so long as the steady state condition prevails. Also, if high transients appear on the line voltage so as to cause the voltage $-E_4$ to increase to −20 volts, the diode 19 remains forwardly biased and the fluctuation is seen at the output terminal 23. However, for low line variations, the voltage $-E_4$ begins to drop below the −16 volt level. When it falls below the value of the regulated emitter voltage ($-E_2$), the diode 19 is biased in a reversed direction. The lower transients thus do not appear at the output of diode 19 because of the reverse bias thereon. The power is then drawn through the series transistor 21. Since the minimum line transient seen at $-E_3$ is −15 volts, the voltage output $-E_1$ will never fall below the required −15 volts. Thus, the voltage fluctuations have been reduced from the presumed −15 to −25 volt variation to only a −15 to −20 volt variation and the steady state voltage has been reduced from a −20 to −16 volts while ensuring that the voltage $-E_1$ will not fall below the required −15 volts. The improvement afforded is graphically illustrated in FIGS. 2*a* and 2*b*, FIG. 2*a* illustrating the voltages delivered to the series regulator 15 without the voltage regulator and FIG. 2*b* illustrating the voltage delivered with the voltage regulator in circuit.

Many applications, and in particular digital computer applications, require a high degree of voltage regulation. In these applications, line transients can adversely effect the computer operation so as to completely interrupt the computing operation necessitating that the computing operation be started over again. Such interruptions, of course, cannot be tolerated. Heretofore the only expedient was to design the transistor series regulator 15 to handle the wide voltage variations. As noted in the example above, without the voltage regulator of FIG. 1, the series regulator 15 would be required to handle steady state voltages of −20 volts and maximum and minimum transients of −25 and −15 volts in order to insure that the input voltage to the series regulator never fell below the −15 volt level. This requires a considerable derating of the power transistors used in the series regulator and the use of a plurality of such transistors in parallel. My invention reduces the line voltage variations considerably and requires the addition of only a few components.

The present invention has the additional advantage of very fast response to line transients since the switching from the high and low voltage sources is entirely accomplished by semiconductor elements.

The circuit of FIG. 1 has been shown as supplying negative voltage inputs to the transistor series regulator. Such negative voltages are commonly required to be supplied to the collectors of p-n-p transistors used as the series regulating elements in the regulator 15. It will be apparent to those skilled in the art, however, that the circuitry of FIG. 1 could easily be adapted to supplying positive voltages by reversing the connections of the diodes 18 and 19 and reference voltages $-E_2$ and substituting an n-p-n transistor for the p-n-p transistor shown.

It will also be apparent to those skilled in the art that the reference source 10 and transformer 12 may be any source of alternating voltage for supplying the rectifying diodes 18 and 19. For example, an embodiment of my invention adapted for use with a three-phase power supply is shown in FIG. 3. For convenience those components which may be identical to those shown in FIG. 1 bear the same reference numerals. Three-phase generators 35 and 36 are connected to drive a load 37 connected between the terminals 23 and 28. The load 37 may be the final load being driven, or commonly it comprises both a transistor series regulator such as 15, shown in FIG. 1 and a load connected thereto. Three-phase transformers 38 and 39 are connected individually to the three-phase generators 35 and 36. Although star connections are shown, it will be apparent to those skilled in the art that delta connections are also satisfactory. Each of the secondary windings of transformer 38 are connected to a pair of diodes 40—41, 42—43, and 44—45. In like manner, the secondary windings of transformer 39 are connected to diode pairs 46—47, 48—49, and 50—51. The diodes connected to each of the transformers are poled so as to provide full-wave rectification for the alternating current outputs from the transformers. Thus, the cathodes of diodes 41, 43 and 45 are connected to ground while the anodes of diodes 40, 42 and 44 are connected together as the negative supply to the collector electrode 20 of the transistor 21. The operation of this full-wave rectifier circuit is described on page 678 of the book entitled "Electronic Fundamentals and Applications" written by John D. Ryder and published by Prentice-Hall Inc., 1950. The transformer 38 and the diodes 40 through 45 serve the same function as the high voltage tap 16 and diode 18 of the circuit of FIG. 1. Transformer 39 and diodes 46 through 51 serve an analogous function to that of the low voltage terminal 17 and diode 19. The different magnitude voltage outputs may be obtained by using three-phase generators having different output voltages, or by using transformers having different turns ratios. Thus, the cathodes of diodes 47, 49 and 51 are connected to ground while the anodes of diodes of 46, 48 and 50 connect together and directly to the output terminal 23. No shunt filter capacitors are necessary in the circuit of FIG. 3 because of the reduced ripple of the rectified output from the three-phase power supplies. Transistor 21 is connected as in the circuit of FIG. 1 having its collector electrode 20 connected to the high voltage supply, its base electrode 25 connected to ground through reference voltage source $-E_2$ and its emitter electrode 22 connected to the output terminal 23.

The operation of the circuit of FIG. 3 does not materially differ from that of the circuit of FIG. 1. Ordinarily, the circuit parameters are selected so that the low voltage supply (three-phase generator 36 and transformer 39) supply the power to the load 37 during steady state outputs and high line transient conditions. Power is only drawn through the series transistor 21 from the source 35 and transformer 38 during low line transient conditions. Thus, during steady state conditions, the voltage appearing at the output of the secondary windings of transformer 39 is sufficiently high to bias the diodes 46 through 51 in a forward direction so that power is delivered through them directly to the load 37. Thus, the voltage $-E_4$ out of the diodes 46 through 51 should have a more negative steady state value than the reference voltage $-E_2$. During high line transients, the diodes 46 through 51 remain biased in a forward direction and power continues to be delivered from the three-phase supply 36. If the line voltage falls below the steady state condition, however, the voltage at the output of the secondary windings of transformer 39 is insufficient to bias the diodes 46 through 51 in a forward direction; instead they are reverse biased and serve to disconnect the supply 36 from the load 37. Power is then drawn from the three-phase source 35 through the series transistor 21. The voltage appearing between the terminals 23 and 28 thus never falls below the minimum voltage appearing at the collector electrode of the transistor 21 and never exceeds the voltage $-E_4$ from the low voltage transformer 39.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A voltage regulator comprising a first voltage source, a second voltage source of relatively higher magnitude than said first voltage source, each of said voltage sources adapted for energization by a fluctuating primary voltage supply, output terminals, regulator means coupled between said second voltage source and said output terminals for maintaining the voltage between said output terminals at a predetermined value, means coupled between said first voltage source and said output terminals for selectively connecting said first voltage source to said output terminals in response to a voltage from said first voltage source greater in magnitude than a predetermined value, and means for selectively coupling said second voltage source to said output terminals in response to a voltage from said first voltage source smaller in magnitude than said predetermined value.

2. The voltage regulator defined in claim 1 wherein said first and second voltage sources comprise a transformer having a first winding adapted for energization by said primary voltage supply and a second winding coupled with said first winding, said second winding having means for providing said first and second voltage sources as different magnitude voltages from said second winding.

3. The voltage regulator defined in claim 1 wherein said first and second voltage sources comprise first and second three-phase primary voltage supplies, and first and second three-phase transformers each having a first winding coupled with a respective one of said three-phase voltage supplies and a second winding coupled with a respective first winding, said second winding of said first and second transformers respectively providing said first and second sources.

4. The voltage regulator defined in claim 1 wherein said regulator means comprises a series transistor regulator having its collector electrode coupled to said second voltage source, its emitter electrode coupled to one of said output terminals and its base electrode coupled to the other of said output terminals through a reference voltage source said reference voltage source determining the magnitude of said predetermined voltage which said regulator means maintains between said output terminals.

5. The voltage regulator defined in claim 1 wherein said means coupled between said first voltage source and said output terminals comprises a diode poled so as to be respectively forward and reverse biased when the voltage from said first voltage source is respectively greater and less in magnitude than said regulated voltage.

6. A voltage regulator for reducing high and low primary supply voltage transients comprising a first voltage source, a second voltage source of relatively higher magnitude than said first voltage source, each of said voltage sources being energized by said primary supply voltage, output terminals, means coupled between said second voltage source and said output terminals for regulating the voltage between said output terminals to a predetermined value and further providing a high impedance path when the voltage between said output terminals is increased above said predetermined value, said predetermined value having a magnitude no smaller than the low transient of said second voltage source, means coupled between said first voltage source and said output terminals for providing a low impedance path when the voltage from said first voltage source is greater in magnitude than the value of said regulated voltage and for providing a high impedance path when the voltage from said first voltage source is smaller in magnitude than the value of said regulated voltage, the relative values of said first and second voltage sources and said predetermined voltage being such that the first voltage source is coupled to said output terminals through a low impedance during periods of steady state and high transients and said second voltage source is coupled to said output terminals through a low impedance during periods of low transients.

7. A voltage regulator for reducing high and low primary supply voltage transients comprising first and second alternating current sources, the second of which delivers a higher voltage than the first; a first asymmetrically conducting device connected to said second alternating current source for rectifying the output of same; output terminals; means connected between said first asymmetrically conducting device and said output terminals for regulating the voltage between said output terminals to a predetermined value; a second asymmetrically conducting device connected between said first alternating current source and said output terminals, said second asymmetrically conductive device poled so as to conduct and rectify the output of said first alternating current source when the voltage from said first alternating current source is greater in magnitude than the regulated voltage derived from said second alternating current source.

References Cited in the file of this patent

UNITED STATES PATENTS

| | | |
|---|---|---|
| 1,947,292 | Garman | Feb. 13, 1934 |
| 2,737,600 | Smoot et al. | Mar. 6, 1956 |
| 2,776,382 | Jensen | Jan. 1, 1957 |
| 2,806,963 | Woll | Sept. 17, 1957 |

FOREIGN PATENTS

| | | |
|---|---|---|
| 1,129,336 | France | Sept. 3, 1956 |

OTHER REFERENCES

"Transistorized Regulated Power Supplies," Lowry, Electronic Design, March 1, 1956, pp. 32–35.